July 25, 1950 L. C. RONEY 2,516,424
SAFETY FILLER AND VAPOR RETURN VALVE CONSTRUCTION
Filed May 27, 1946 2 Sheets-Sheet 1

INVENTOR.
LEONARD C. RONEY
BY
ATTORNEY

July 25, 1950  L. C. RONEY  2,516,424
SAFETY FILLER AND VAPOR RETURN VALVE CONSTRUCTION
Filed May 27, 1946 2 Sheets-Sheet 2

INVENTOR.
LEONARD C. RONEY
BY
ATTORNEY

Patented July 25, 1950

2,516,424

UNITED STATES PATENT OFFICE 2,516,424

SAFETY FILLER AND VAPOR RETURN VALVE CONSTRUCTION

Leonard C. Roney, Los Angeles, Calif., assignor, by mesne assignments, to Southwestern Development Company, Los Angeles, Calif., a corporation of California Application May 27, 1946, Serial No. 672,418

2 Claims. (Cl. 277—70)

This invention relates to apparatus for distribution, storage and dispensing of liquefied gas and particularly to valved vessels or bottles providing for use of liquefied fuel gas at isolated points of consumption.

Such liquefied fuel gases develop at ordinary temperatures dangerously high pressures, constituting a fire and explosion hazard, and there are employed for their safe retention vessels of high strength steel equipped with valve fittings to provide a high degree of safety.

Valves used often suffer damage through use or aging and must be replaced. It is desirable that they be safely replaceable or repairable while the vessel is charged with gas and auxiliary valve structure has heretofore been employed to trap the gas while the repair is made.

The fittings of the valve structure by which connections are made to filling and/or utilization apparatus are disposed to project outside the envelope of the vessel for convenience in use but in this position they are exposed to damage by impact such that their effectiveness as a seal may be impaired and the provision of the auxiliary valve has heretofore been such that this valve is positioned inside the vessel envelope and protected from such injury so that even though the sealing valve be damaged, the escape of vaporized gas in dangerous degree is prevented by the auxiliary valve.

Former fittings of this character have been such that the base for the outer valve seat was disposed outside the valve body and so was exposed to damage. It is one of the objects of this invention to so provide that the outer valve base with its seat is entirely and protectively accommodated within the body of the fitting.

It is another object of this invention to so provide that the seating of the valve seat base of the external valve is normally sealed by a gasket within the body of the valve fitting.

A further object of this invention is to so provide that when a connection is made to filling or utilization equipment by suitable hose and adapters, a gasketed seal is effected between the adapter and the fitting, and to provide so that concurrently with effecting that seal, the valve seat base of the outer valve has its connection with the valve body effectually sealed by the same.

The present invention has for another object the provision of improvements such that the exposed portions of the valve structure and fittings are less easily damaged and in this regard both the valves are carried by a single integral body which effectually prevents damage to the valve structures internally thereof.

Another object of the invention is to provide for more effective trapping action by the auxiliary or excess flow valve when the outer valve is rendered ineffective through damage, removal, or normal operation.

The invention is applicable with various types of valves employed in connection with such vessels; such as quick filler or back pressure check valves, excess flow valves, vapor return valves, and combination filler, back pressure, and discharge valves, and it is a further object of this invention to provide valve structures of these various types incorporating the advantages above set forth.

Other objects and advantages will become apparent upon consideration of the following specification and the accompanying drawings, wherein.

Brief reference is now made to the general combination which is present in all the modifications of the drawings, and the same reference characters are applied to the corresponding parts in the various figures, after which each modification will be described in detail.

Figure 1:
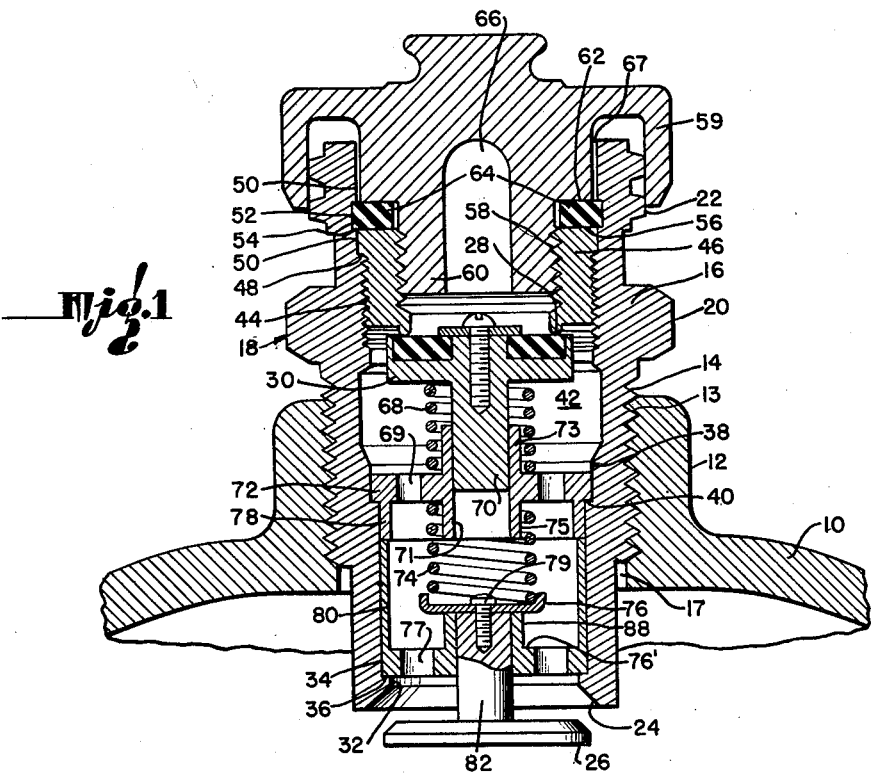
Fig. 1 is a fragmentary sectional view illustrating a storage vessel fitted with quick filling and excess flow valves and closure cap with seal.

The apparatus comprises a vessel 10 of suitable material and thickness provided with a projection 12 having an internal thread 13 to receive a companion thread 14 on the body 16 of the valve structure 18.

The body 16 is provided with a wrench engageable portion 20 by which it may be permanently fixed in the vessel 10 and body 16 is threaded at 22 for receiving a companion fitting of a flexible hose or the like, not shown, but to be understood to be associated with charging or utilization equipment.

The body 16 provides an outer part thereof projecting outwardly of the exterior surface of the envelope 10, which outer part is exposed to damage by direct impact, and an inner part positioned inwardly of the exterior of the envelope which inner part is considerably protected by the envelope from direct impact.

The body 16 provides a passage therethrough in which there are mounted the two valves above referred to, the outer valve being designed to effect a positive seal under certain conditions and the inner valve trapping the gas within the vessel under certain other conditions. The valves also function for other specific purposes depending upon the particular application, as will be referred to.

The inner valve includes a valve seat 24 against which a moving valve 26 engages for the purpose of closing or partially closing the passage through the body 16. The outer valve arrangement includes a valve seat 28 against which a moving valve 30 engages for closing the passage.

Figure 2:
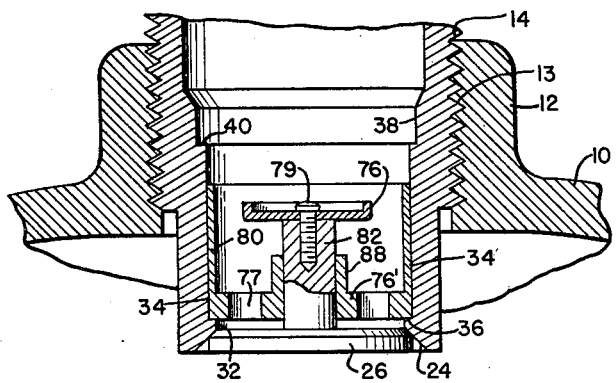
Fig. 2 is a fragmentary view taken from Fig. 1 to illustrate the trapping action.
Figure 3:
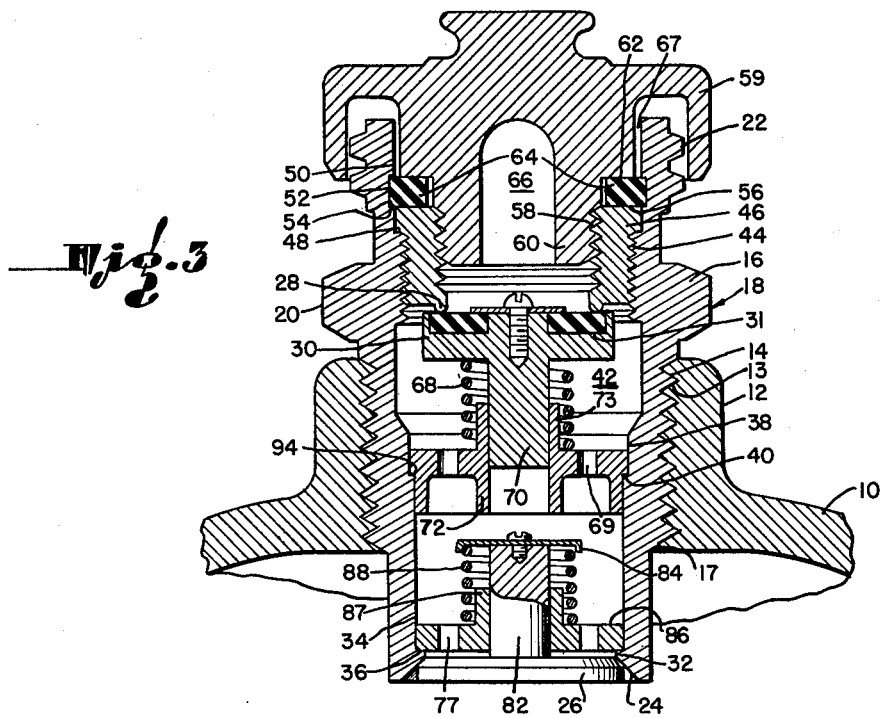
Fig. 3 is a view similar to that of Fig. 1 illustrating a filling valve and a safety check valve.

Referring now particularly to Figs. 1, 2 and 3, the body 16 provides an annular lip 32 located adjacent the valve seat 24, and a cylindrical bore 34 joined by an axially outwardly facing shoulder 36. Outwardly of the bore 34 in the direction of the outside of the vessel 10, the body 16 is counterbored at 38 and is provided with an outwardly facing annular abutment 40. Outwardly of the counterbore 38 the body 16 provides a valve chamber 42; and outwardly thereof the body is internally threaded at 44, the thread crest diameter being slightly greater than the diameter of the counterbore 38. A valve seat base 46 which carries the valve seat 28 of the outer valve is threaded thereto and abuts a further shoulder 48 formed at the outer end of the thread 44, and a passage terminating counterbore 50 is formed above the shoulder 48. The body 16 also provides an annular recess 52 interrupting the counterbore 50 a short distance outwardly of the shoulder 48, and provides a gasket seat 54. The gasket seal 54 is flush with a gasket seat 56 provided by the outward end of the valve seat base 46 when in its seated position. The valve seat base 46 is internally threaded at 58 to receive a suitable fitting. Thus it receives a sealing cap 59, or hose fitting, not shown, having a cored threaded projection 60 and a shoulder 62 providing a gasket engaging face. The shoulder 62 engages a gasket 64 to compress it against the gasket seats 54 and 56 of the body 16 and the valve seat base 46 respectively. It will be observed therefore that the gasket 64 is caused to effect a seal at the outer end of the threads 44 and 58. This prevents escape of vapor from the chamber 44; and also prevents such escape from a space 66 at the outlet side of the valve 30 into a portion 67 of the passage through the body 16. It will easily be seen that by removing the base 46, the structure of the valve 30 may readily be removed for replacement.

Referring now particularly to Fig. 1, the valve 30 is pressed against the seat 28 by a spring 68. The spring 68 surrounds a piston-like stem 70 sliding in a cylinder 71 formed in a disc-shaped support 72. The periphery of the support 72 fits in the counterbore 38 and is seated on the shoulder 40. Two tubular portions 73 and 75 integral with the support 72 form an extension of the cylinder 71. The portion 73 provides a guide for the spring 68 and the portion 75 provides a centering guide for a spring 74. The spring 68 bears against the outer face of the support 72 and the inner surface of the valve 30 to close the valve 30 against the valve seat 28. The spring 74 bears against the inner face of the support 72, and the outer side of a spring seating washer 76. The washer 76 is mounted on the outer end of the valve stem 82 of the valve 26 by a screw 79. The spring 74 tends to unseat the support 72 from the shoulder 40 and is prevented from doing so by the spring 68. The shoulder 40 therefore normally forms a fixed base for the support 72. The valve stem 82 is reciprocably mounted in a support 76', having a tubular portion 88, against which the washer 76 engages in stopping opening movement of the valve 26. The support 76' is thus held against the shoulder 36 by the spring 74. An annular skirt 78 formed integral with the support 72 fits within the bore 34 and a second annular skirt 80 formed integral with the support 76' fits within the bore 34, being disposed to abut the skirt 78.

The valve 30, springs 68 and 74 and support 72 are removable upon removal of the seat base 46, as shown in Fig. 2. The valve 26 is biased to open position by the spring 74. Supports 72 and 76 provide passages 69 and 77 for fluid flow.

Figure 4:
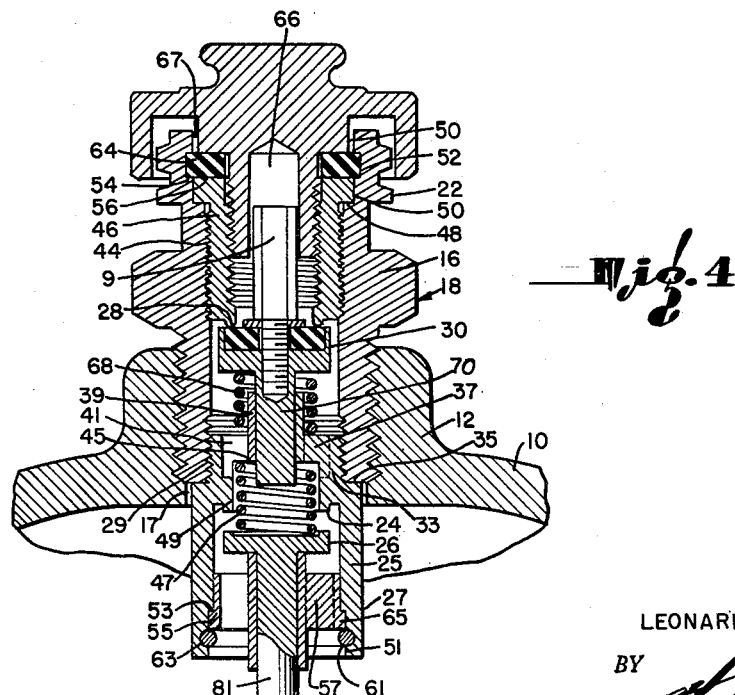
Fig. 4 is a view similar to those of Figs. 1 and 3, but showing a structure providing for discharge of gas for utilization or for vapor release.

When a hose to a utilizing apparatus is connected to replace the cap shown in Fig. 1 and the valve 30 is held unseated by any positive means, such as the stem 39, shown in Fig. 4, the gas passes both valves without hindrance. Should the hose break, the valve 30 will not close, but the check valve 26 will engage the seat 24 and prevent excess flow. In the event the valve 30 closes thereafter, as upon removal of the hose, the valve 26 is soon thereafter released, the seating thereof being insufficiently tight to prevent equalization of pressure at both sides of the valve.

Should the outer end of the body 16 be sheared off, as shown in Fig. 2, the valve 26 promptly closes, the pressure of the spring 74 having been removed.

If it is desired to replace the seat facing of the valve 30, the valve 30 is first placed in depressed position with any available tool. The outflow of gas causes the valve 26 to close against the action of the spring 74 and then the base 46 may be removed to permit withdrawal of the valve 30, spring 68, support 72, and spring 74. Escape of large quantities of gas from the vessel is prevented by the seated valve 26.

Referring now particularly to Fig. 3, the valve 26 is provided with a stem 82 carrying a dished spring seating washer 84. The stem 82 is reciprocably mounted in a disc-like support 86 having a tubular portion 87. The support 86 is normally seated against the shoulder 36 by a coil expansion spring 88 inserted between the support 86 and the washer 84 to surround the stem 82. By its action, the spring 88 draws the valve 26 to its seat 24 and the support 86 against the shoulder 36 formed by the lip 32.

The valve 30 is provided with a replaceable packing to engage the seat 28 and a stem 70 reciprocably mounted in a support 72. The support 72 is substantially identical with the support 72 of Fig. 1 and is provided with a shoulder 94 normally stopped by the shoulder 40. The valve 30 is biased to closed position against the valve seat 28 by the expansion coil spring 68. It will be observed that the valve 26 of Fig. 3 does not permit flow out of the vessel 10, but provides for trapping the gas when the valve 30 is removed or unseated for any reason except when filling, in which event, both valves open for inward flow. It will be observed that the bodies 16 in Figs. 1 and 3 are substantially identical as are the outer valve elements. Only the inner valves are different in structure. The valve assemblies having the different component functions relating to the inner valves are therefore provided by a minimum number of kinds of parts.

The valve fitting of Fig. 4 will now be described. This fitting provides not only for filling the vessel 10, but also for discharge of the gas to utilization apparatus. It also prevents excess flow out of the vessel 10.

Except as pointed out in the following, the construction of the fitting of Fig. 4 is similar to the constructions of the fittings of Figs. 1 and 3. Similar parts in Figs. 1, 3, and 4 have been described and identified by the same reference characters in the foregoing description of Figs. 1 and 3.

The valve 30 has secured thereto a rod 9 which extends into the space 66. The rod forms an operator which is engaged by a suitable adapter device on a connecting hose, not shown, when connection is made to the threads 22. Such engagement results in unseating the valve 30 to allow gas to flow through the passage from the vessel 10 to the utilization apparatus, also not shown.

The structure forming the support for the valve 30 and the structure of the inner valve are specifically different from those of Figs. 1 and 3. The body 16 is provided with an internal thread 29 at its inner end, into which there is threaded a valve fitting sub-assembly 27.

The sub-assembly 27 comprises a tubular member 25 having an external diameter slightly less than the diameter of the opening 17 through the vessel 10. The member 25 is provided with a reduced end portion 33, by which it is secured to the threads 29 of the body 16. The member 25 is provided with a shoulder 35 abutting the inner end of the body 16 when the member 25 is fully engaged with the body 16.

The member 25 provides a web 37 at one end thereof providing a central guideway for the valve stem 70 of the valve 30. A spring centering tubular extension 39 is formed integral with the member 25, and a spring 68 surrounds the extension 39 to engage the web 37 and the valve 30. The web 37 is perforated at 41 to provide free flow past the web. The web 37 further provides a seat 45 for a spring 47. The member 25 further provides the inwardly facing valve seat 24 surrounding a reduced bore 49 surrounding the spring 47.

The member 25 provides at its inner end a counterbore 51 forming a shoulder 53. A support 55 is provided for the valve 26 and the support 55 is removably secured in the tube member 25. The support 55 is provided with a web portion 57 and a flange portion 65. The support 55 is held in position with its flange 65 abutting the shoulder 53 by a retainer ring 61, received in a groove 63 turned in the member 25. The web 57 provides a tubular guideway for a stem 81 on the valve 26, and perforations 77 are provided to extend through the web 57 to allow fluid passage therethrough. The spring 47 bears on the outer end of the valve 26 and resists closure of the valve. However, when excess flow occurs outwardly, the resistance of the spring 47 is overcome and the valve 26 closes against the seat 24.

I claim as my invention:

1. In a valve structure: a body having a passage therethrough; a first valve for controlling flow through said passage, said valve being located adjacent the downstream end of said passage; a second valve spaced upstream of the first valve, said second valve being removable; a support slidably received in the passage and disposed between the respective valves; spring means reacting between said support and the first valve for urging said valve in the opening direction; and a second spring reacting between said support and the second valve for urging said valve in the closing direction.

2. In a valve structure: a body having a fluid passage with an annular lip around the passage and a valve seat disposed in one direction, there being a shoulder disposed in the opposite direction along said passage; a valve member disposed to engage the seat and having a stem and a support for the stem, the support being arranged to abut against the shoulder; a spring retainer secured to said stem and engageable, when in one position, with the stem support; a slidable member within said passage; a spring reacting between said member and said retainer for urging the latter into engagement with said support and yieldingly maintaining the valve in an open position; a removable base spaced from said member, said base having a valve seat; a valve member disposed in the passage and adapted to engage said seat; and spring means reacting between said member and last mentioned valve urging said valve in the closing direction.

LEONARD C. RONEY.

REFERENCES CITED

The following references are of record in the file of this patent:

UNITED STATES PATENTS

| Number | Name | Date |
|---|---|---|
| 599,650 | Stromwall | Feb. 22, 1898 |
| 1,022,556 | Johnson | Apr. 9, 1912 |
| 1,411,483 | Floyd | Apr. 4, 1922 |
| 1,633,642 | Kramer | June 28, 1927 |
| 1,695,722 | Smith | Dec. 18, 1928 |
| 1,905,942 | Lawler | Apr. 25, 1933 |
| 2,041,970 | Shepherd | May 26, 1936 |
| 2,155,179 | Buttner | Apr. 18, 1939 |
| 2,306,012 | Campbell | Dec. 22, 1942 |
| 2,361,865 | Norway | Oct. 31, 1944 |

FOREIGN PATENTS

| Number | Country | Date |
|---|---|---|
| 499,519 | Great Britain | Jan. 25, 1939 |